United States Patent
Broberg et al.

(10) Patent No.: US 10,779,559 B2
(45) Date of Patent: Sep. 22, 2020

(54) PROCESSING OF SOYBEANS

(71) Applicant: TETRA LAVAL HOLDINGS & FINANCE S.A., Pully (CH)

(72) Inventors: Lars Broberg, Jonstorp (SE); Per-Åke Persson, Falsterbo (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 280 days.

(21) Appl. No.: 15/671,893

(22) Filed: Aug. 8, 2017

(65) Prior Publication Data

US 2017/0332680 A1 Nov. 23, 2017

Related U.S. Application Data

(62) Division of application No. 14/418,828, filed as application No. PCT/EP2013/065909 on Jul. 29, 2013, now abandoned.

(30) Foreign Application Priority Data

Aug. 1, 2012 (SE) ..................... 1250904-8

(51) Int. Cl.
  *A23L 11/00* (2016.01)
  *A23L 27/24* (2016.01)
  *A23L 27/50* (2016.01)
  *A23J 1/14* (2006.01)

(52) U.S. Cl.
  CPC ............. *A23L 11/07* (2016.08); *A23J 1/14* (2013.01); *A23L 27/24* (2016.08); *A23L 27/50* (2016.08); *A23V 2002/00* (2013.01)

(58) Field of Classification Search
  CPC .. A23J 1/14; A23L 11/07; A23L 27/50; A23L 27/24; A23V 2002/00
  See application file for complete search history.

(56) References Cited

FOREIGN PATENT DOCUMENTS

| DE | 10 2009 016489 A1 | 10/2010 |
| EP | 2 241 194 A1 | 10/2010 |
| JP | 52-136997 A | 11/1977 |
| JP | 58-175473 A | 10/1983 |
| KR | 10 2008 0097531 A | 11/2008 |
| KR | 10 2008 0097962 A | 11/2008 |

OTHER PUBLICATIONS

International Search Report (PCT/ISA/210) dated Jan. 20, 2014, by the European Patent Office as the International Searching Authority for International Application No. PCT/EP2013/065909.
"Tetra Alwin Soy—Soya base extraction unit", Retrieved from the Internet: URL:http://www.tetrapak.com/fr/SiteCollectionDocuments/Processing/PDF_Equipements/Tetra_Alwin_Soy.pdf, retrieved on Oct. 29, 2013. (2 pages).
"Tetra Almix—Turbo Mixer/Dynamic Stator suitable for Tetra Almix Batch Mixers", Jan. 1, 2011, Retrieved from the Internet: URL:http://www.tetrapak.com/usprocessing/Productdocumentation/Mixer/Tetra Almix_Dynamic Stator -Brochure.pdf, retrieved on Oct. 29, 2013, XP055085739. (2 pages).
International Search Report and Written Opinion of the International Searching Authority (Forms PCT/ISA/220, PCT/ISA/210 and PCT/ISA/237) dated Jan. 20, 2014, by the International Bureau of WIPO in corresponding International Application No. PCT/EP2013/065909. (18 pages).

*Primary Examiner* — Subbalakshmi Prakash
(74) *Attorney, Agent, or Firm* — Buchanan Ingersoll & Rooney PC

(57) ABSTRACT

A process for processing soybeans, said process comprising separating the soy sauce from a fermented mixture through decanting and splitting the soybeans into discernible pieces.

19 Claims, 3 Drawing Sheets

PROCESSING OF SOYBEANS

CROSS REFERENCES TO RELATED APPLICATIONS

This application is a Divisional of U.S. patent application Ser. No. 14/418,828, filed on Jan. 30, 2015, which is a National Stage Entry of PCT/EP2013/065909, filed on Jul. 29, 2013, and claims priority under 35 U.S.C. § 119 to Swedish Patent Application No. 1250904-8, filed on Aug. 1, 2012, the disclosures of all three of which are incorporated herein by reference in their entirety.

TECHNICAL FIELD

This application relates to a process, a stator, a use and an arrangement for improved processing of fermented products, and in particular to a process, a stator, a use and an arrangement for improved handling of fermented soybeans to extract soy sauce and the like.

BACKGROUND

The soybean is a species of legume native to East Asia, widely grown for its edible bean which has numerous uses. The plant is classed as an oilseed rather than a pulse by the Food and Agricultural Organization (FAO). Soybeans produce significantly more protein per acre than most other uses of land. Traditional fermented foods include soy sauce, fermented bean paste, natto, and tempeh, among others.

The traditional process for producing for example soy sauce is performed by sorting, rinsing and then cooking the soybeans to a desired level. After the cooking the soybeans are cooled to an optimum fermentation temperature and thereafter transferred to inoculation vats where the inoculation is done by adding a starter culture, for example a *Bacillus* or *Aspergillus* strain of bacteria. The mixture is then fermented for a time span of a few days to a couple of weeks in these large vats. The resulting culture is traditionally called Koji and is transferred to fermentation tanks where brine, or individual salt and water, is added to form a mixture traditionally called Moroni. The Moroni is fermented for a minimum of three months and sometimes up to a year. After this period the Moroni (which is a mash) is pressed or washed to extract the sauce. The pressing and washing is a batch process where sieving in several stages which are essential for the purity of the resulting soy sauce.

The quality of the resulting soy sauce is determined by the protein content and the purity of the soy sauce. The effectiveness of the soybean protein extraction and the purification of the resulting product is thus of importance.

The batch process, not being continuous is a disadvantage as it prevents the process from being fully automated and increases operation costs in that the batches need to be prepared, delivered and retrieved.

There is thus a need for an improved manner of continuously extracting protein at a high yield. There is also a need for an improved manner of continuously purifying fermented products such as soy sauce.

SUMMARY

According to one aspect, it is an object of the teachings of this application to overcome the problems listed above by providing an arrangement for extraction of soy sauce comprising a decanter for separating the soy sauce from a fermented mixture through decanting.

According to one aspect, it is an object of the teachings of this application to overcome the problems listed above by providing an arrangement for extracting protein from soybeans comprising a means for splitting the soybeans into discernible pieces.

According to one aspect, it is an object of the teachings of this application to overcome the problems listed above by providing an arrangement for processing soybeans comprising a decanter for extraction of soy sauce by separating the soy sauce from a fermented mixture through decanting and a means for splitting the soybeans into discernible pieces.

Such arrangements provide simple solutions allowing continuous operation and that result in end products having high quality.

In one embodiment the means for splitting the soybeans is comprised of a stator arranged to revolve at high speeds having a series of holes.

Arrangements according to the teachings herein are beneficial in that they provide an end product of a high qualitative purity in a continuous manner. This is achieved by an insightful combination of the splitting means (the stator) and the decanter, which combination removes the need for a separate buffering process of removing top flocculation and bottom sediment.

In one embodiment the arrangement further comprises a clarifier which increases the purity of the end product. In fact, after the clarifier the resulting product is ready to be sold. The arrangement as disclosed herein is thus highly efficient and cost efficient to operate providing an end result of high quality.

According to one aspect, it t is an object of the teachings of this application to overcome the problems listed above by providing a stator for use as means for splitting soybeans, said stator comprising a circular member arranged with a series of holes.

According to one aspect, it t is an object of the teachings of this application to overcome the problems listed above by providing a use of a stator for splitting soybeans.

According to one aspect, it t is an object of the teachings of this application to overcome the problems listed above by providing a process for extraction of soy sauce, said process comprising separating the soy sauce from a fermented mixture through decanting.

According to one aspect, it t is an object of the teachings of this application to overcome the problems listed above by providing a process for extracting protein from soybeans, said process comprising splitting the soybeans into discernible pieces.

According to one aspect, it t is an object of the teachings of this application to overcome the problems listed above by providing a process for processing soybeans, said process comprising separating the soy sauce from a fermented mixture through decanting and splitting the soybeans into discernible pieces.

It is an object of the teachings of this application to overcome the problems listed above by providing a soy sauce produced according to a process according to above.

The inventors of the present invention have realized, after inventive and insightful reasoning that by decanting a fermented solution the solution can effectively be used to separate the desired product from husks or impurities and also other particles in a simple and elegant solution that allows for continuous operation. This has been confirmed by extensive experimentation.

The inventors of the present invention have also realized, after inventive and insightful reasoning, that by splitting the beans an increased surface for protein extraction is achieved without risking that an emulsion is generated thereby providing a simple and elegant solution that allows for continuous operation. The inventors have further realized that to perform such splitting a stator designed according to herein may beneficially be used to provide a simple and elegant solution that allows for continuous operation.

The teachings herein find use in, but is not limited to, extraction and production of soy sauce, fish sauce and other fermented products. The manner disclosed herein also find use in fermenting wheat products.

An arrangement and a process according to the teachings herein can beneficially be used in and integrated into the production Ketjap Manis and like products, the teachings herein being combined with other processes and arrangements enabling such production.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figures 1, 2, 3, 4:
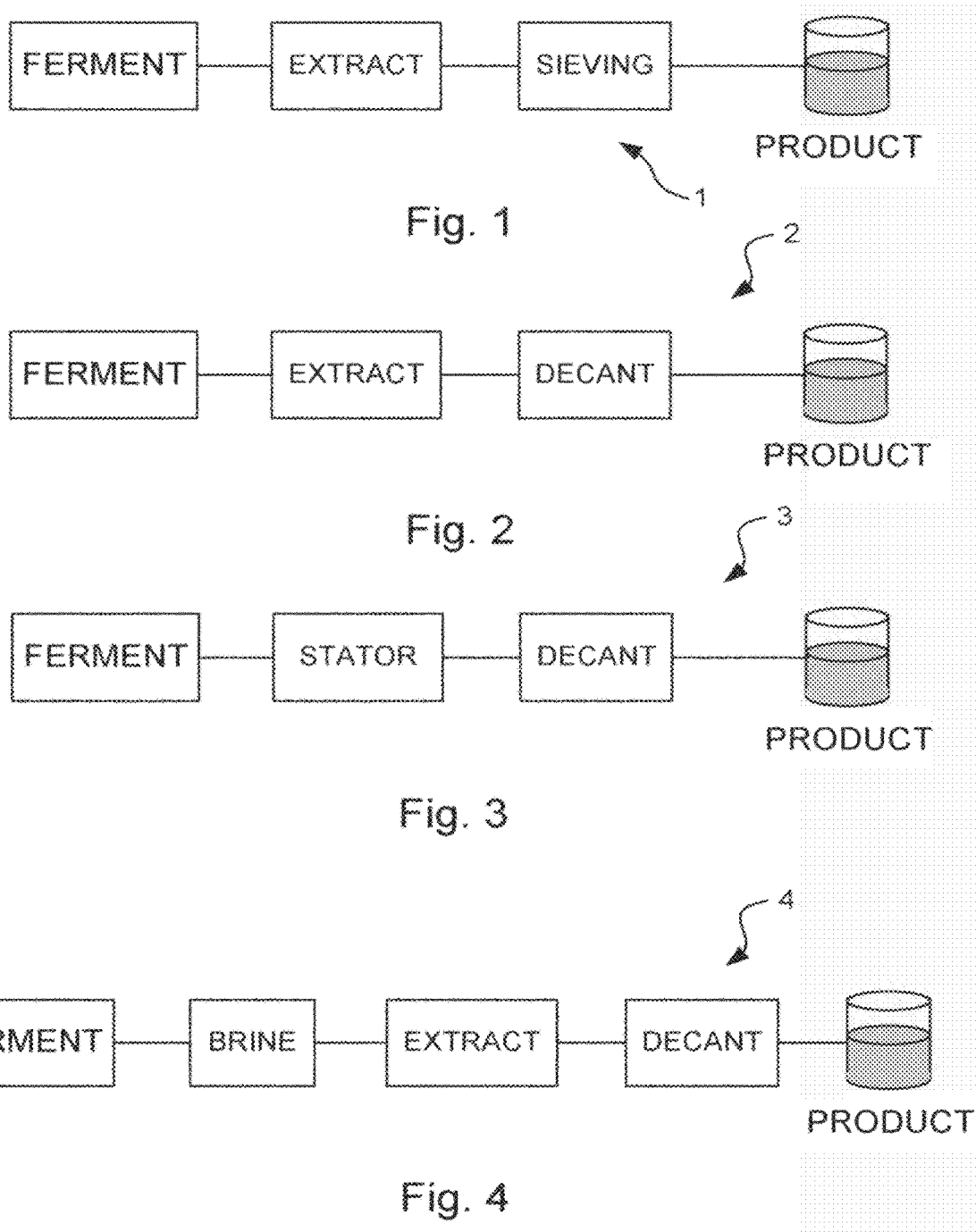
FIG. 1 shows an arrangement for a traditional process for extraction of soy sauce.
FIG. 2 shows an improved arrangement for a process according to an embodiment herein for an improved extraction of soy sauce according to one embodiment of the teachings of this application.
FIG. 3 shows an improved arrangement for a process according to an embodiment herein for an improved extraction of soy sauce according to the teachings of this application.
FIG. 4 shows an improved arrangement for a process according to an embodiment herein for an improved extraction of soy sauce according to the teachings of this application.

FIG. 1 shows an arrangement for a traditional process for extraction of soy sauce. The fermented Moroni (referenced FERMENT in FIG. 1) is pressed or otherwise treated to extract (referenced EXTRACT in FIG. 1) the soy sauce which is then sieved (referenced SIEVING in FIG. 1) repeatedly to produce the finished product, being soy sauce.

FIG. 2 shows an improved arrangement 2 for a process according to an embodiment herein for an improved extraction of soy sauce. The arrangement 2 comprises a decanter (referenced DECANT in FIG. 2) for extracting the soybeans and soybeans particles from the husk and other impurities, thereby efficiently defattening the mixture and increasing the protein yield of the finished product. In one embodiment the decanter is implemented as an Alfa Laval Foodtec® 500 or 510 decanter. These decanters have enough capacity to efficiently separate the husks and other particles and impurities from the beans or bean fragments.

Decanters are known in other fields, but have not been used for the purpose of extracting soy sauce from the Moron mixtures. By realizing, after insightful reasoning, that decanters may also be used for separating the husks and impurities from the mixture, a simple and elegant, yet effective solution is provided to enable an efficient continuous process.

The use of decanters can also be used for separating soymilk from husks and impurities.

A problem that arises when pressing the Moroni mixture is that the resulting mash is prone to generate an emulsion of the fats and the proteins. It is nearly impossible to mechanically separate the fats from the proteins in such an emulsion.

FIG. 3 shows an improved arrangement 3 for a process according to an embodiment herein for an improved extraction of soy sauce. The arrangement 3 is arranged to split, chop or slice the soybeans in the mixture through the use of splitting means instead of pressing them. In one embodiment this slicing is achieved by the use of a revolving stator (referenced STATOR in FIG. 3). The stator is arranged to revolve at high speed, for example 2500 RPM. In one embodiment the revolving speed is in the range of 1000 to 4000 RPM and in one embodiment the revolving speed is 2000 to 3000 RPM.

The stator is further arranged to have large holes. The holes should be large enough to at least partially receive a bean to be processed. The edges of the holes will interact with the soybeans by splitting them into smaller pieces. The resulting increased surface of the soybeans enables a higher yield of soy protein. The desired size of the resulting pieces depends on the finished product. The smaller the pieces, the higher the protein yield, but if the pieces are too small, the risk for generating an emulsion increases. The pieces should therefore be of a size where the pieces are still individually discernible and does not form a powder. By having rectangular cross sections of the stator holes a cleaner cut of the soybeans is achieved resulting in a cleaner product and less risk of an emulsion. It also provides a higher protein yield. In one embodiment the stator is arranged to split the soybeans into quarter-sized pieces. As will be described later on, the holes may also have other cross sections such as circular.

The size of the holes and the revolving speed of the stator interact in such a way that the higher the speed and the smaller the holes, the higher the risk of creating an emulsion. Smaller holes allows for less adjustment of the revolving speed. The holes should be at least the same substantial size as the particle to be split, in the case of the soy sauce, the same size of the soybean.

In one embodiment the stator is implemented as a Tetra Almix in-line® mixer with a specially adapted stator. More details of the stator will be given with reference to FIG. 6.

The use of stators is known in other fields, but stators have not been used for the purpose of extracting soy sauce from Moroni mixtures and like mixes. By realizing, after insightful reasoning and careful and extensive experimentation, that stators may also be used for slicing or chopping the soybeans to provide a resulting increased surface for extracting the protein, a simple and elegant, yet effective solution is provided to enable an efficient continuous process which provides a high protein yield. For example, a prior art system produces soy sauce having a protein yield of 2.1% per each produced litre. A system according to the teachings herein will produce a soy sauce having a protein yield of more than 2.5% per each produced litre, thus providing an increase by over 20% for the protein yield.

To facilitate the handling of the Moroni mixture, the process and arrangement includes a station or step where brine (or individual salt and water) is added to the mixture. The brine affects the qualities of the resulting product, and also facilitates the run of the resulting mixture through the revolving stator and the subsequent decanter as the mixture is more fluid than the Moroni mixture on its own. The brine further affects the resulting yield of protein and the more brine that is added, the larger the total amount of extracted protein.

FIG. 4 shows an improved arrangement 4 for a process according to an embodiment herein for an improved extraction of soy sauce. The arrangement 4 is arranged to add brine (referenced BRINE in FIG. 4) to the fermented mixture before or during the extraction.

In one embodiment the process is arranged to keep the mixture at a temperature at a stable or low temperature, for example below 45 degrees Celsius. Increasing the temperature will affect the quality and cleanliness of the resulting product and it is therefore beneficial to maintain a low temperature all through the process.

Figure 5:
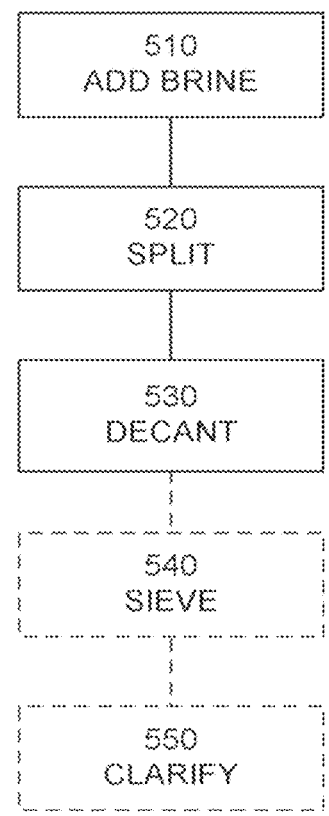
FIG. 5 illustrates a schematic flowchart for a process for extracting protein from and clarifying a mixture according to an embodiment of the teachings herein.

FIG. 5 illustrates a schematic flowchart for a process for extracting protein from and clarifying a mixture according to an embodiment of the teachings herein. In a first step 510 brine (or water and/or salt) is added to the mixture. In a succeeding or simultaneous step 520 the beans in the mixture are split, for example using a stator. The mixture is then run through a decanter in step 530.

To further clarify and clean the resulting product a further step of running the mixture through a clarifier is performed in step 550. Depending on the desired finished product and the quality of the product the resulting mixture may also be run through a sieve in step 540. These steps are optional and indicated as such in FIG. 5 by the dashed lines.

Figures 6A, 6B:
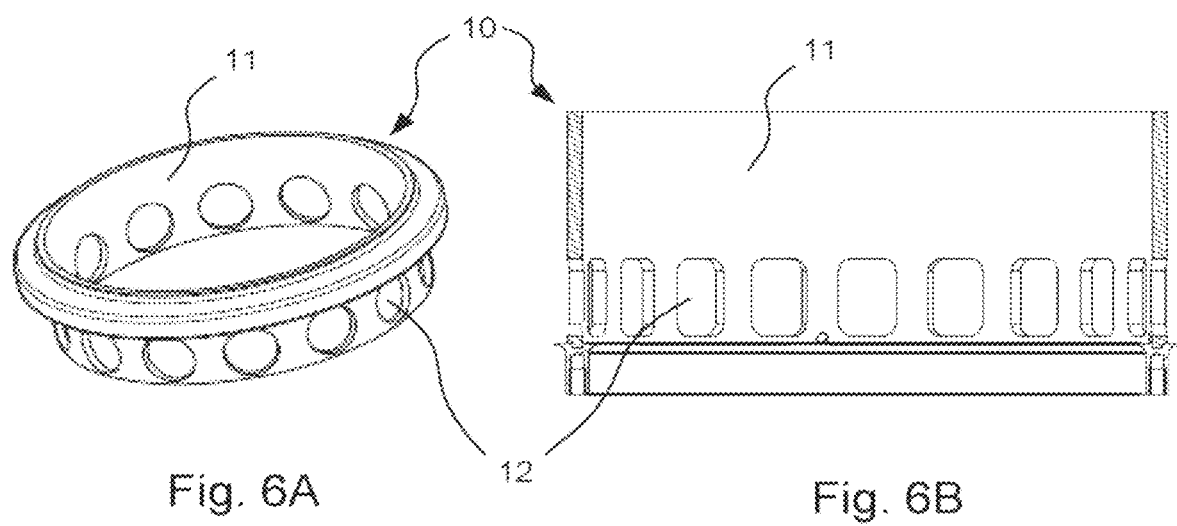
FIGS. 6A and 6B each shows an illustration of a stator to be used in an arrangement according to one embodiment of the teachings of this application.

FIG. 6A shows an illustration of a stator 10 to be used in an arrangement according to above. The stator 10 is comprised of a circular member 11 having an inner diameter of 200 mm and a thickness of material of 4 mm. The stator 10 is arranged with a plurality of relatively large holes 12. In the example embodiment of FIG. 6, the stator 10 is arranged with fourteen holes 12, each having a diameter of 30 mm. In this embodiment the stator is a TetraPak stator having a product number CP3097735. In an alternative embodiment, see FIG. 6B which shows an illustration of a cross section of a stator 10 to be used in an arrangement according to above, the stator 10 is a TetraPak stator having a product number CA3026040 having an inner diameter of 200 mm, a thickness of material of 5.5 mm (in one embodiment 4 mm), and twenty holes 12 having a rectangular cross section measuring 30 mm (width) by 50 mm (height). In an embodiment the thickness of material is 4 to 6 mm. Experiments have shown that such a stator is more beneficial in that it provides cleaner cuts. In one embodiment the holes 12 have different sizes. The size of the hole depends on design parameters for the stator 10 such as the thickness, the revolving speed, the material, the number of the holes and the thickness of the material to name a few.

Figure 7:
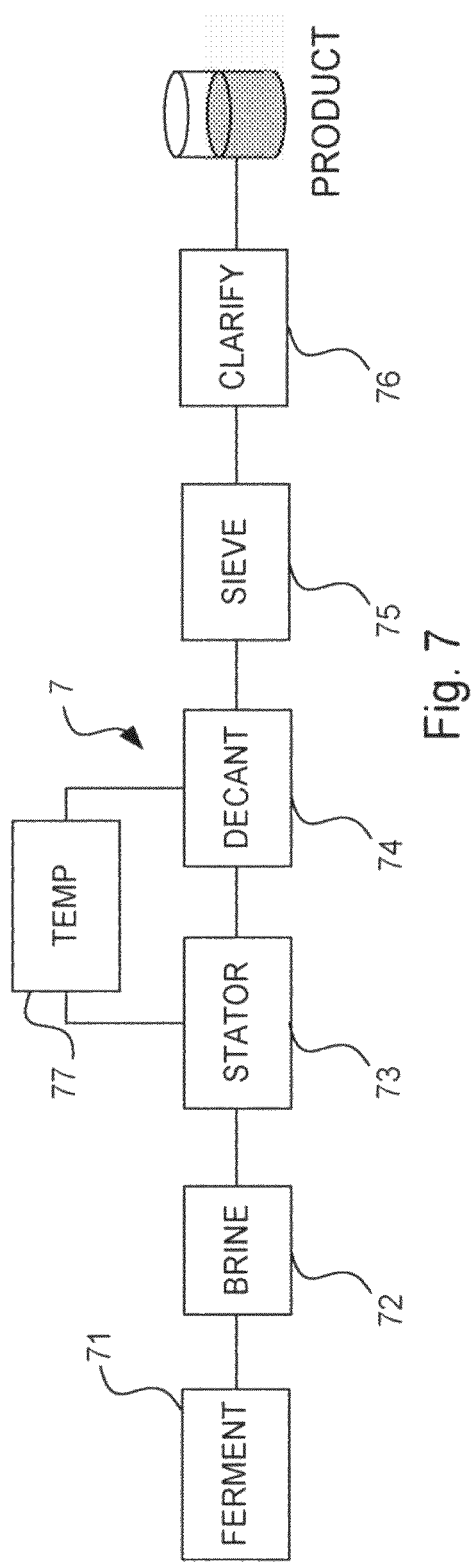
FIG. 7 shows a schematic illustration of an arrangement according to an embodiment of the teachings herein.

FIG. 7 shows a schematic illustration of an arrangement 7 according to an embodiment of the teachings herein. A fermenting station 71 is arranged to ferment a mixture. Brine (or water and/or salt) is effectively added to the mixture by means for adding brine in a brine station 72. The brine is either added as a solution or by adding salts and water individually. The diluted solution is then run through a high speed revolving stator 73 and thereafter decanted in a decanter 74. To further improve the quality of the product the solution may be sieved in a sieve 75 and also or alternatively clarified in a clarifier 76. To regulate the temperature during the process temperature regulating means 77 are part of the arrangement. The temperature regulating means 77 may be implemented through a cooling system or other known manner of cooling a production line.

Experiments have shown that using a process as described above, soy sauce with a fat content of less than 0.5% can be achieved.

The addition of the brine which allows for the beans to be split with a stator also makes the solution suitable for decanting with a decanter.

The use of a decanter and a stator is thus technically linked to provide an improved process and arrangement for such a process for processing soybeans.

One aspect of the disclosure here involves an arrangement (2, 3, 4, 7) for extraction of soy sauce comprising a decanter (74) for separating the soy sauce from a fermented mixture through decanting. Another aspect of the disclosure involves a stator (73, 10) for use as means for splitting soybeans, wherein the stator (10) comprises a circular member (11) arranged with a series of holes (12). A further aspect involves the use of a stator (73, 10) for splitting soybeans. Further aspects of the disclosure include a process for extraction of soy sauce, wherein the process comprises separating the soy sauce from a fermented mixture through decanting, and a process for processing soybeans, wherein the process comprises separating the soy sauce from a fermented mixture through decanting and splitting the soybeans into discernible pieces.

One benefit of the teachings herein is that the process and arrangement provides an end product of high quality.

Another benefit of the teachings herein is that the process and arrangement provides a high yield of protein. The process and arrangement provides a lowered fat content.

One more benefit of the teachings herein is that the process and arrangement enables continuous operation and is cheaper to operate. The process and arrangement also prevents an emulsion from being generated.

The teachings herein relating to the use of the decanter and/or the stator find use in manufacturing and producing soy sauce, but also find use in producing other fermented products such as fish sauce, wheat-based products and other grain-based products.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A process for processing soybeans, the process comprising:
   splitting the soybeans in a fermented mixture into pieces;
   separating soy sauce from the fermented mixture through decanting, the separating of the soy sauce from the fermented mixture through decanting occurring after the splitting of the soybeans; and
   the pieces resulting from the splitting of the soybeans being of a size by which the pieces do not form a powder.

2. The process of claim 1, further comprising conveying the soy sauce through a clarifier.

3. The process of claim 1, wherein the splitting of the soybeans is performed using a stator which includes a circular member possessing a circumference and plural holes arranged around the circumference.

4. The process of claim 3, wherein the plural holes include holes possessing a rectangular cross-section.

5. The process of claim 3, wherein the plural holes include holes possessing a circular cross-section.

6. The process of claim 3, wherein the circular member possesses an inner diameter of 200 mm.

7. The process of claim 3, wherein the circular member possesses a wall thickness between 4 mm and 6 mm.

8. The process of claim 3, wherein the plural holes are sized to at least partially receive the soybeans.

9. The process of claim 3, wherein at least some of the plural holes in the circular member are of different sizes relative to one another.

10. The process of claim 3, wherein the circular member possesses a circular edge, and the plural holes are equidistant from the circular edge.

11. The process of claim 3, including producing soy sauce having a protein yield of more than 2.5% per each produced liter of soy sauce.

12. The process of claim 3, further comprising rotating the stator at a speed in the range of 1000 to 4000 revolutions per minute.

13. The process of claim 3, further comprising rotating the stator at a speed in the range of 2000 to 3000 revolutions per minute.

14. The process of claim 1, wherein the splitting of the soybeans includes chopping the soybeans into the pieces.

15. The process of claim 1, further comprising adding brine to the fermented mixture before the decanting.

16. The process of claim 1, further comprising conveying the soy sauce through a sieve and then conveying the soy sauce through a clarifier after conveying the soy sauce through the sieve.

17. The process of claim 1, further comprising sieving the fermented mixture using a sieve after the decanting.

18. The process of claim 1, further comprising controlling a temperature of the fermented mixture so that the fermented mixture is maintained at a temperature below 45 degrees Celsius.

19. A soybean processing method comprising:
   slicing or chopping soybeans in a Moroni mixture using a revolving stator to split the soybeans in the Moroni mixture into smaller pieces and thereby increase a surface of the soybeans;
   conveying the Moroni mixture through a decanter to extract the soybeans and soybean particles from husks and other impurities in the Moroni mixture, the conveying of the Moroni mixture through the decanter occurring after the slicing or chopping of the soybeans in the Moroni mixture.

* * * * *